United States Patent
Han et al.

(10) Patent No.: US 9,758,019 B2
(45) Date of Patent: Sep. 12, 2017

(54) AIR CONDITIONING SYSTEM

(71) Applicant: Hyundai Motor Company, Seoul (KR)

(72) Inventors: Kwangok Han, Seoul (KR); Young Chul Kim, Gyeonggi-Do (KR); Sunghae Park, Busan (KR)

(73) Assignee: Hyundai Motor Company, Seoul (KR)

( * ) Notice: Subject to any disclaimer, the term of this patent is extended or adjusted under 35 U.S.C. 154(b) by 780 days.

(21) Appl. No.: 14/068,205

(22) Filed: Oct. 31, 2013

(65) Prior Publication Data

US 2014/0154965 A1    Jun. 5, 2014

(30) Foreign Application Priority Data

Dec. 5, 2012    (KR) .......................... 10-2012-0140591

(51) Int. Cl.
*B60H 1/24*    (2006.01)
*B60H 1/00*    (2006.01)
*B60H 1/26*    (2006.01)

(52) U.S. Cl.
CPC ......... *B60H 1/248* (2013.01); *B60H 1/00828* (2013.01); *B60H 1/26* (2013.01)

(58) Field of Classification Search
CPC .............. B60H 1/248; B60H 1/00828; B60H 1/00464; B60H 1/00849; B60H 1/26
USPC .................. 454/139, 141, 145, 163
See application file for complete search history.

(56) References Cited

U.S. PATENT DOCUMENTS

| | | | | |
|---|---|---|---|---|
| 4,779,672 A * | 10/1988 | Seikou | ............... | B60H 1/00471 165/100 |
| 5,478,275 A * | 12/1995 | Malm | ..................... | F04D 27/00 415/102 |
| 5,957,769 A * | 9/1999 | Miyata | ............... | B60H 1/00457 454/139 |
| 6,110,035 A * | 8/2000 | Uemura | ............. | B60H 1/00064 454/121 |
| 6,253,841 B1 * | 7/2001 | Obara | ................ | B60H 1/00849 165/204 |
| 6,782,944 B2 * | 8/2004 | Kim | .................... | B60H 1/00064 165/202 |
| 8,368,329 B1 * | 2/2013 | Depew | .................... | H02P 23/22 318/272 |
| 2012/0241126 A1 * | 9/2012 | Kishi | ................. | B60H 1/00849 165/42 |

FOREIGN PATENT DOCUMENTS

| KR | 1999-0060145 | * | 7/1999 | ............... B60H 1/12 |
|---|---|---|---|---|
| KR | 10-2000-0049725 | * | 4/2000 | ............... B60H 1/00 |

\* cited by examiner

*Primary Examiner* — Gregory Huson
*Assistant Examiner* — Dana Tighe
(74) *Attorney, Agent, or Firm* — Mintz Levin Cohn Ferris Glovsky and Popeo, P.C.; Peter F. Corless

(57) ABSTRACT

An air conditioning system that includes a casing that has a flow channel connected to an inside of a vehicle to supply or discharge air. A motor is mounted on one side of the casing to generate a normal direction torque and a reverse direction torque and a first fan is disposed on one side of the flow channel to be connected to an output shaft of the motor and to be rotated. A second fan is disposed on one side of the first fan to be fixedly mounted in the shaft and to be rotated. Additionally, a variable connecting unit that connects the first fan to the shaft of the motor is rotated when the motor is rotated in a normal direction and has a torque of the shaft of the motor not to be transmitted to the first fan when the motor is rotated in a reverse direction.

6 Claims, 6 Drawing Sheets

AIR CONDITIONING SYSTEM

CROSS-REFERENCE TO RELATED APPLICATION

This application claims priority to and the benefit of Korean Patent Application No. 10-2012-0140591 filed in the Korean Intellectual Property Office on Dec. 5, 2012, the entire contents of which are incorporated herein by reference.

BACKGROUND (a) Field of the Invention

The present invention relates to an air conditioning system that heats air inside a vehicle using a heater, cools air inside a vehicle using a coolant, or dehumidifies air inside a vehicle to maintain a pleasant interior condition.

(b) Description of the Related Art

In general, an air conditioning system is installed within a vehicle to drive a heater to blow hot air in winter (e.g., cold weather conditions) and an air conditioning system is operated to blow cold air in summer (e.g., warm weather conditions).

Recently, inflow of external harmful air to a vehicle is automatically blocked and harmful air generated within a vehicle is removed to allow the air conditioning for a vehicle to perform and an interior condition of a vehicle may be maintained to be pleasant. On the other hand, research on a method or a structure for rapidly discharging contaminated air or smell in a vehicle to the exterior of the vehicle are continuously being conducted.

The above information disclosed in this section is only for enhancement of understanding of the background of the invention and therefore it may contain information that does not form the prior art that is already known in this country to a person of ordinary skill in the art.

SUMMARY

Therefore, the present invention provides an air conditioning system that may rapidly discharge air inside a vehicle to the exterior of the vehicle to remove contaminated air or any smells in the vehicle and to maintain a pleasant interior condition.

As described above, an air conditioning system according to an exemplary embodiment of the present invention may include a casing that has a flow channel connected to an inside of a vehicle configured to supply or discharge air, a motor mounted on one side of the casing to generate a normal direction torque and a reverse direction torque, a first fan disposed on one side of the flow channel to be connected to a shaft that is an output shaft of the motor and to be rotated, a second fan disposed on one side of the first fan to be fixedly mounted within the shaft and to be rotated, and a variable connecting unit that has the first fan connected to the shaft of the motor and rotated when the motor is rotated in a normal direction and has a torque of the shaft of the motor not to be transmitted to the first fan when the motor is rotated in a reverse direction. The first fan and the second fan have internal air flow in the normal direction when the shaft of the motor is rotated in the normal direction and the second fan may be configured to discharge the internal air to the exterior when the shaft of the motor is rotated in the reverse direction.

The variable connecting unit may include a central housing fixedly mounted in a rotation center of the first fan to rotate together with the first fan and the shaft of the motor may be disposed to pass through a center of the central housing, a housing protrusion formed on an internal circumference of the central housing, a shaft protrusion formed within the shaft of the motor to correspond to the housing protrusion, and a moving unit configured to push or pull the central housing in an axial direction of the shaft. A protrusion stopper configured to stop a movement of the housing protrusion may be formed within the shaft.

The moving unit may include a permanent magnet formed on one side and an electromagnet facing the permanent magnet and may have north (N) and south (S) poles based on supplied electricity to push or pull the permanent magnet. The permanent magnet may be formed at a lower end of the central housing. The electromagnet may be disposed to face the permanent magnet to be fixedly mounted in a fixing unit. In addition, a magnet stopper configured to stop a movement of the permanent magnet may be formed in the fixing unit.

The second fan may be disposed at a leading end of the shaft of the motor and the first fan may be disposed behind the second fan. The permanent magnet may be disposed behind the first fan, the electromagnet may be disposed behind the permanent magnet, and the motor may be disposed behind the electromagnet. Furthermore, the first fan may be disposed under the second fan (e.g., at a position below the second fan), the permanent magnet may be disposed under the first fan, the electromagnet may be disposed under the permanent magnet, and the motor may be disposed under the electromagnet. In addition, the permanent magnet and the electromagnet may rotate relatively with a predetermined gap while the motor is operated.

As described above, the air conditioning system according to the exemplary embodiment of the present invention may flow the external air to the inside of the vehicle or may discharge the internal air to the exterior to rapidly discharge the smell or contaminated air in the vehicle to the exterior of the vehicle. A fan of an air conditioner may flow the external air or discharge the internal air.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Additionally, it is understood that the term controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

An exemplary embodiment of the present invention will hereinafter be described in detail with reference to the accompanying drawings.

Figure 1:
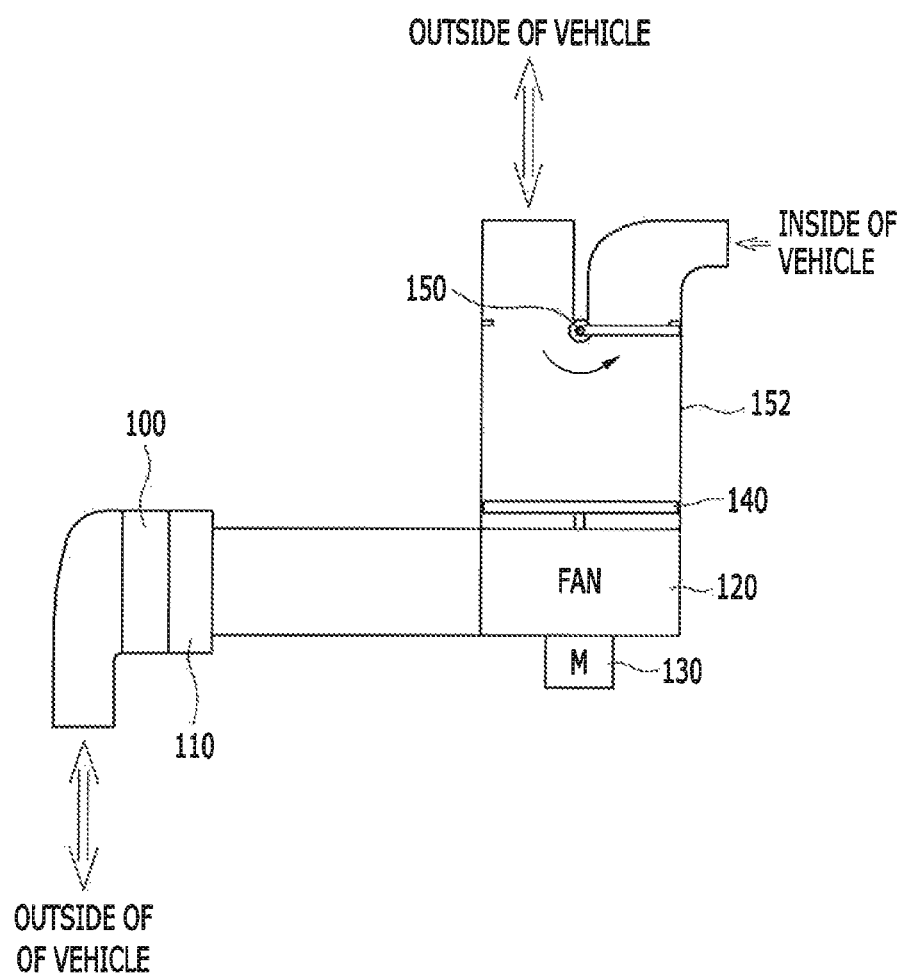
FIG. 1 is an exemplary schematic block diagram of an air conditioning system according to an exemplary embodiment of the present invention.

FIG. 1 is an exemplary schematic block diagram of an air conditioning system according to an exemplary embodiment of the present invention. The present invention will now be described more fully with reference to the accompanying drawings, in which exemplary embodiments of the invention are shown. This invention may, however, be embodied in many different forms and should not be construed as being limited to the embodiments set forth herein.

Referring to FIG. 1, an air conditioning system may include a casing 152, a second fan 140, a first fan 120, a motor 130, a heater 100, an evaporator 110, and an intake door 150.

When the first fan 120 or the second fan 140 is rotated by the motor 130 in a normal direction, external or internal air of a vehicle may be absorbed and the absorbed air may be supplied to the inside of the vehicle via the heater 100 or the evaporator 110. When the second fan 140 is rotated by the motor 130 in a reverse direction, the internal air of the vehicle may be discharged to the exterior of the vehicle to remove the contaminated air or smell in the vehicle. In particular, the intake door 150 allows the inside of the vehicle to be connected to the exterior of the vehicle.

According to an exemplary embodiment of the present invention, when the motor 130 is rotated in the reverse direction, the first fan 120 may not be rotated and only the second fan 140 may be rotated in the reverse direction to rapidly discharge the internal air to the exterior of the vehicle.

Figure 2:
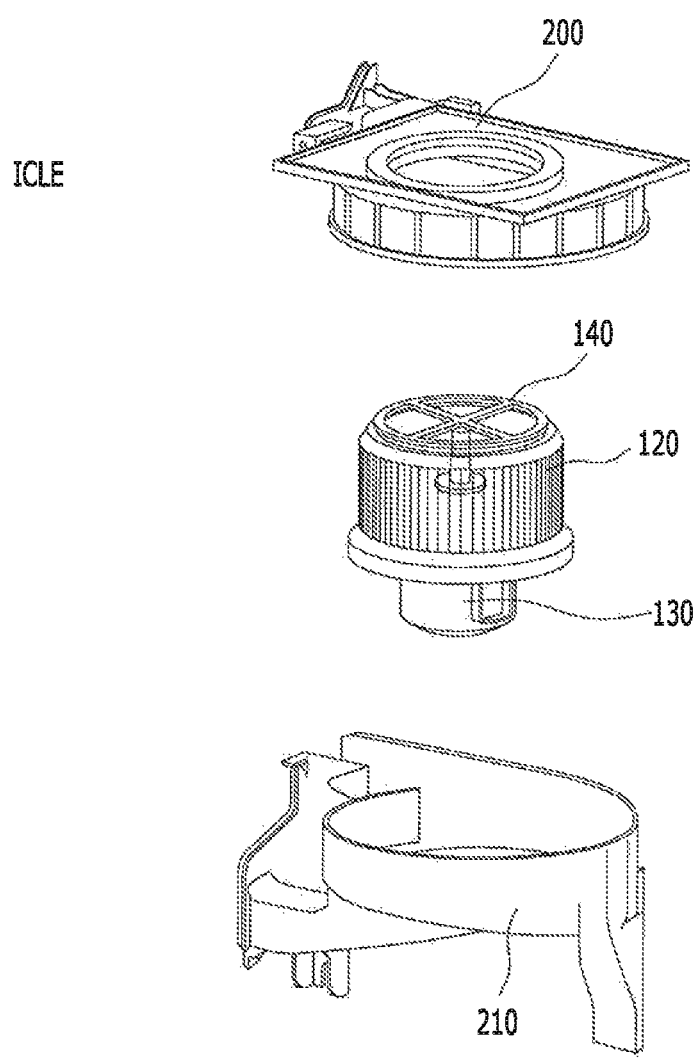
FIG. 2 is an exemplary detailed view of a first fan and a second fan in an air conditioning system according to an exemplary embodiment of the present invention.
Figure 3:
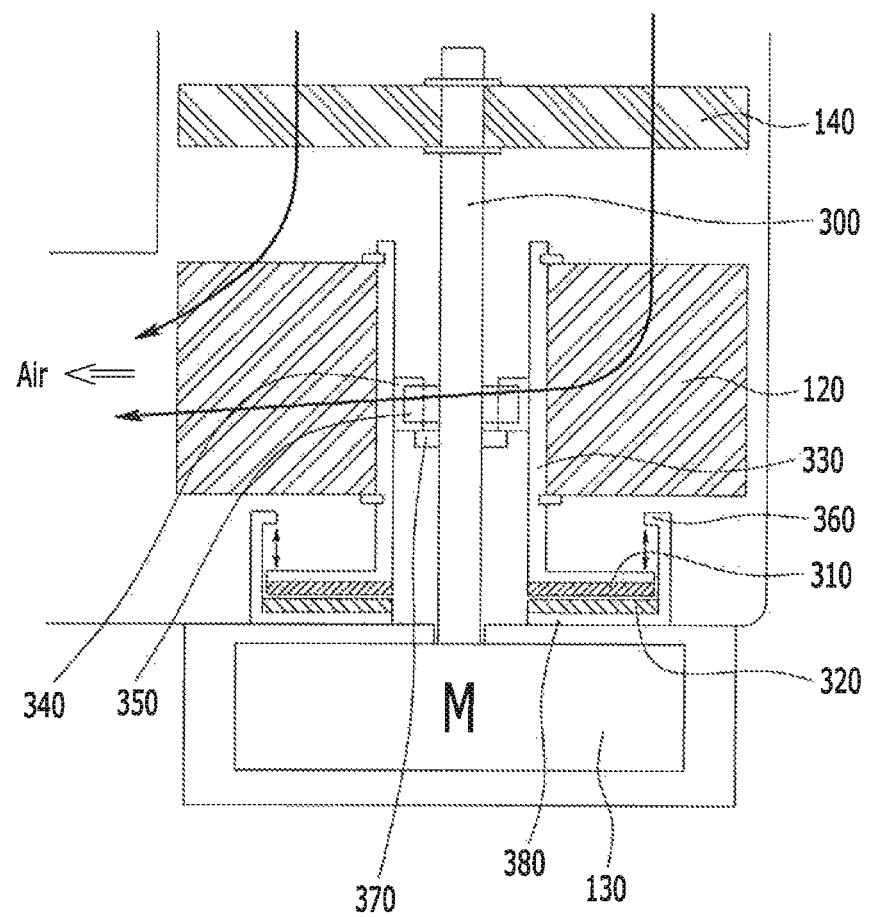
FIG. 3 is an exemplary cross-sectional view illustrating external air absorbed into the vehicle by a first fan and a second fan in an air conditioning system according to an exemplary embodiment of the present invention.

Referring to FIGS. 2 and 3, structures of the first fan 120 and the second fan 140 will be described in detail. FIG. 2 is an exemplary detailed view of a first fan and a second fan in an air conditioning system according to an exemplary embodiment of the present invention. FIG. 3 is an exemplary cross-sectional view illustrating external air absorbed into the vehicle by a first fan and a second fan in an air conditioning system according to an exemplary embodiment of the present invention.

Referring to FIG. 2, an air conditioning system may include an upper cover 200, the second fan 140, the first fan 120, the motor 130, and a lower cover 210. The first fan 120 may be disposed on the motor 130 and the second fan 140 may be disposed on the first fan 120. The second fan 140, the first fan 120, and the motor 130 may be disposed between the lower cover 210 and the upper cover 200. The lower cover 210 and the upper cover 200 may form a part of the casing 152, detailed description of which will be omitted.

Referring to FIG. 3, the motor 130 may be configured to transmit a torque to a shaft 300 and the shaft 300 may be configured to rotate vertically. The second fan 140 may be fixed to a leading end of the shaft 300 to perform a normal or reverse rotation together with the shaft 300. Within the shaft 300, the first fan 120 may be disposed between the second fan 140 and the motor 130.

Furthermore, a central housing 330 may surround an external circumference of the shaft 300. Specifically, the shaft 300 may pass through a center of the pipe shaped central housing 330. A gap may be formed between an internal circumference of the central housing 330 and the external circumference of the shaft 300. A housing protrusion 340 may be formed on one side of the internal circumference of the central housing 330 and a shaft protrusion 350 may be formed on the external circumference of the shaft 300 to correspond to the housing protrusion 340.

To prevent the housing protrusion 340 and the shaft protrusion 350 from separating, a protrusion stopper 370 may be formed in the shaft 300 under the shaft protrusion 350. According to an exemplary embodiment of the present invention, the shaft protrusion 350, the housing protrusion 340, and the protrusion stopper 370 may be integrated with or attached and fixed to corresponding parts.

The first fan 120 may be variably connected to the shaft 300. In particular, a variable connecting unit may be configured to variably connect the first fan 120 to the shaft 300 and may include the central housing 330, the housing protrusion 340, the shaft protrusion 350, and a moving unit. The moving unit may include a permanent magnet 310 formed at a lower end of the central housing 330 and an electromagnet 320 fixed under the central housing 330 to face the permanent magnet 310. The electromagnet 320 may be magnetized using supplied electricity to push the central housing 330 upward together with the permanent magnet 310. When the central housing 330 is pushed upward, the shaft protrusion 350 and the housing protrusion 340 may separate and the torque of the shaft 300 may not be transmitted to the central housing 330 and the first fan 120.

According to an exemplary embodiment of the present invention, the electromagnet 320 may be fixed onto a fixing unit 380 fixed to the motor 130 and a magnet stopper 360 that restricts a distance by which the permanent magnet 310 is moved may be integrally formed on the fixing unit 380.

As illustrated in the drawing, a uniform space may be required between the first fan 120 and the second fan 140 to allow the first fan 120 and the central housing 330 to move upward and a uniform gap may be required between the permanent magnet 310 and the electromagnet 320 to allow the permanent magnet 310 and the electromagnet 320 to rotate relatively to each other. When the shaft 300 is rotated by the motor 130 in the normal direction as shown in FIG. 3, the electromagnet 320 may not be magnetized and the shaft protrusion 350 and the housing protrusion 340 may engage with each other to transmit the torque of the shaft 300 to the first fan 120 and the second fan 140. Therefore, the first fan 120 and the second fan 140 may flow external or internal air to the inside of the vehicle or circulate the external or internal air.

Figure 4:
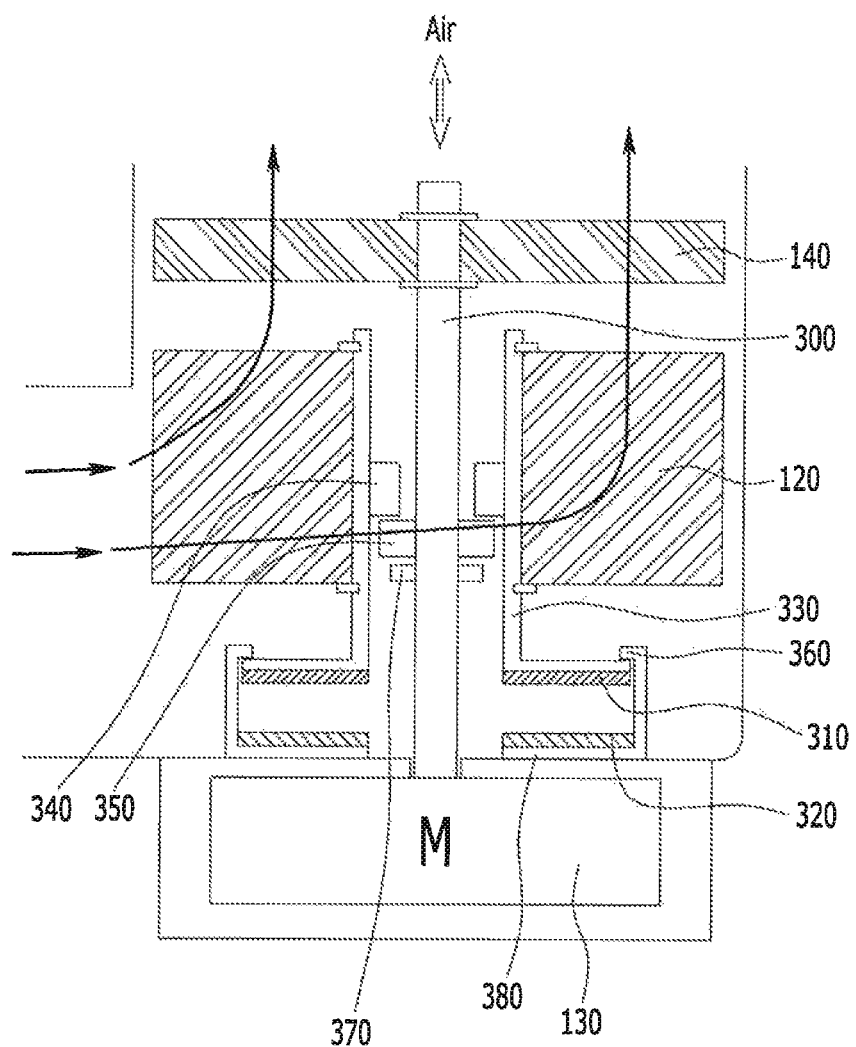
FIG. 4 is an exemplary cross-sectional view illustrating internal air discharged to the exterior of the vehicle by a second fan in an air conditioning system according to an exemplary embodiment of the present invention.

FIG. 4 is an exemplary cross-sectional view illustrating internal air discharged to the exterior of the vehicle by a second fan in an air conditioning system according to an exemplary embodiment of the present invention. Referring to FIG. 4, the electromagnet 320 may be magnetized and the electromagnet 320 may push the central housing 330 vertically together with the permanent magnet 310. In particular, movements of the permanent magnet 310 and the central housing 330 may be stopped by the magnet stopper 360. Therefore, the shaft protrusion 350 and the housing protrusion 340 may be separated. In particular, the second fan 140 and the first fan 120 may be maintained to be separated.

When the motor 130 rotates the shaft 300 in the reverse direction, the second fan 140 may perform the reverse rotation to rapidly discharge the internal air to the exterior of the vehicle. In particular, the intake door 150 may connect the inside of the vehicle to the exterior.

Figure 5:
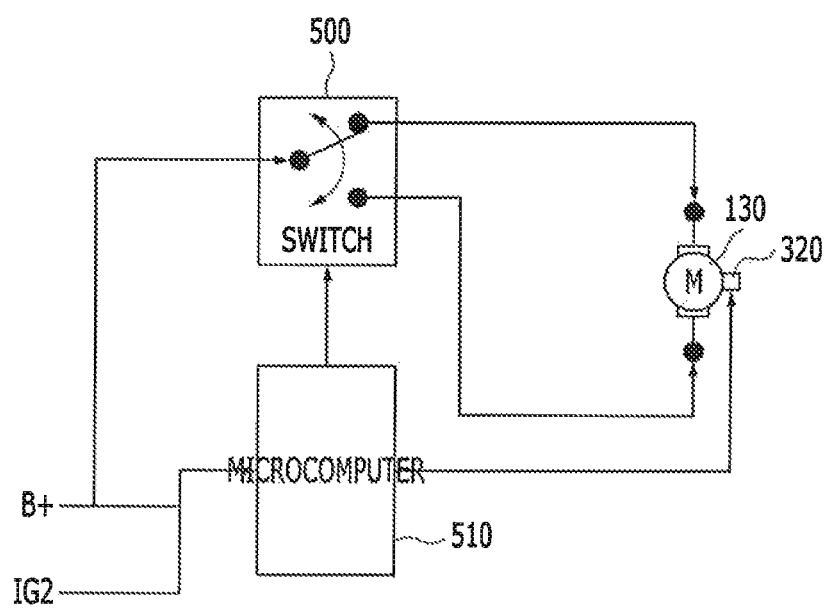
FIG. 5 is an exemplary schematic block diagram of a circuit for operating an air conditioning system according to an exemplary embodiment of the present invention.

FIG. 5 is an exemplary schematic block diagram of a circuit that operates an air conditioning system according to an exemplary embodiment of the present invention. Referring to FIG. 5, B+ denotes a battery voltage and IG2 denotes a position signal of an ignition key. A microcomputer 510 (e.g., a controller) may be configured to operate a switch 500, the motor 130, and the electromagnet 320 using the battery voltage and the position signal of the ignition key.

Figure 6:
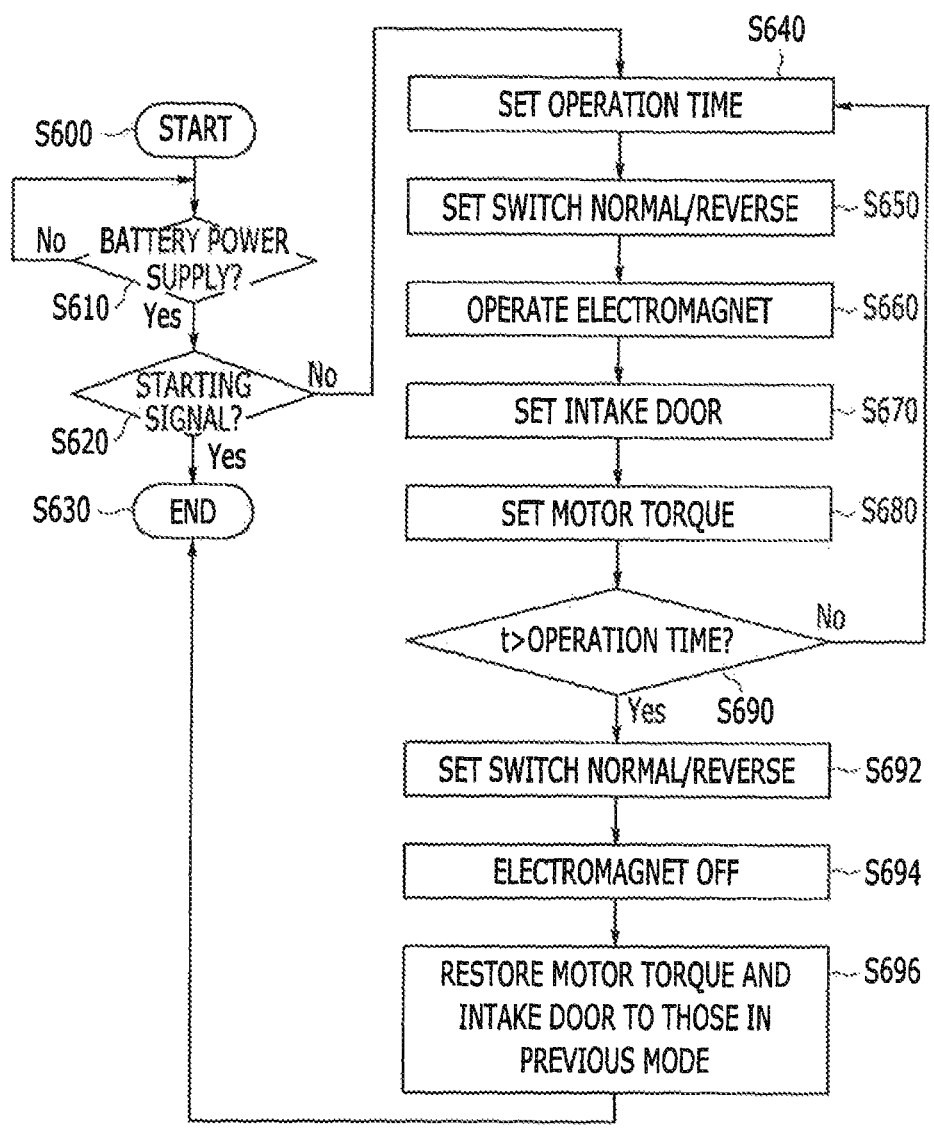
FIG. 6 is an exemplary flowchart illustrating a method of operating an air conditioning system according to an exemplary embodiment of the present invention.

FIG. 6 is an exemplary flowchart illustrating a method of operating an air conditioning system according to an exemplary embodiment of the present invention.

Operation of the air conditioning system may begin in S600 wherein it is determined S610 whether a power supply of a battery is sufficient. Then, in S620 the controller may be configured to determine whether a starting signal is generated. In other words, the controller may be configured to determine whether an engine is operated. Specifically, when the starting signal is generated (e.g., in a state where the engine is operated), S969 may be performed to cause the motor 130 to perform the normal rotation and the intake door 150 to maintain a previous mode.

When the starting signal is not sensed in S620 (e.g., in a state where the engine is not operated), an operation time may be set in S640. The operation time may be a time for discharging the internal air to the exterior of the vehicle using the second fan 140. In S650, the switch 500 may be operated by the controller to cause the motor 130 to be rotated in the reverse direction. In S660, electricity may be supplied to the electromagnet 320 to prevent the first fan 120 from being rotated by the shaft 300.

Furthermore, in S670, a position of the intake door 150 may be set. In particular, the intake door 150 may connect the inside of the vehicle to the exterior to allow the internal air to be discharged to the exterior of the vehicle. Additionally, in S680, a torque of the motor 130 may be set to apply a predetermined voltage/current to the motor 130 and to discharge contaminated air or smell in the vehicle to the exterior of the vehicle. In S690, is the controller may be configured to determine whether the operation time of the motor 130 passes and the operation of the motor 130 may be stopped. In S692, the switch 500 may be operated by the controller to set the motor 130 to be rotated in the normal direction. Further, in S694, supply of a power supply to the electromagnet 320 may be stopped and in S696, the torque of the motor 130 and the intake door 150 may be restored to those in a previous mode.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

| Description of symbols | |
|---|---|
| 100: heater | 110: evaporator |
| 120: first fan | 130: motor |
| 140: second fan | 150: intake door |
| 152: casing | 200: upper cover |
| 210: lower cover | 300: shaft |
| 310: permanent magnet | 320: electromagnet |
| 330: central housing | 340: housing protrusion |
| 350: shaft protrusion | 360: magnet stopper |
| 370: protrusion stopper | 380: fixing unit |
| 500: switch | 510: controller |

What is claimed is:

1. An air conditioning system, comprising:

a casing having a flow channel connected to an inside of a vehicle to supply or discharge air;

a motor mounted on one side of the casing to generate a normal direction torque and a reverse direction torque;

a first fan disposed on one side of the flow channel to be connected to a shaft that is an output shaft of the motor and to be rotated;

a second fan disposed on one side of the first fan to be fixedly mounted in the shaft and to be rotated; and a variable connecting unit that connects the first fan to the shaft of the motor, is rotated when the motor is rotated in a normal direction, and when the motor is rotated in a reverse direction, a torque of the shaft of the motor is not transmitted to the first fan, wherein the first fan and the second fan discharge or supply air flow to the inside of the vehicle when the shaft of the motor is rotated in the normal direction and the second fan discharges the internal air to an exterior when the shaft of the motor is rotated in the reverse direction, when the variable connecting unit includes:

a central housing fixedly mounted in a rotation center of the first fan to rotate together with the first fan, wherein the shaft of the motor passes through a center of the central housing;

a house protrusion formed on an internal circumference of the central housing;

a shaft protrusion formed in the shaft of the motor to correspond to the housing protrusion; and a moving unit that pushes or pulls the central housing in an axial direction of the shaft, wherein the moving unit includes:
   a permanent magnet on one side; and
   and electromagnet that faces the permanent magnet and having north (N) and south (S) poles based on supplied electricity to push or pull the permanent magnet
wherein the second fan is disposed at a leading end of the shaft of the motor and the first fan is disposed behind the second fan, and
wherein the permanent magnet is disposed behind the first fan, the electromagnet is disposed behind the permanent magnet, and the motor is disposed behind the electromagnet.

2. The air conditioning system of claim 1, wherein:
a protrusion stopper that stops a movement of the housing protrusion is formed in the shaft.

3. The air conditioning system of claim 1, wherein the permanent magnet is formed at a lower end of the central housing, and the electromagnet faces the permanent magnet to be fixedly mounted in a fixing unit.

4. The air conditioning system of claim 3, wherein a magnet stopper that stops a movement of the permanent magnet is formed in the fixing unit.

5. The air conditioning system of claim 3, wherein the first fan is disposed under the second fan, the permanent magnet is disposed under the first fan, the electromagnet is disposed under the permanent magnet, and the motor is disposed under the electromagnet.

6. The air conditioning system of claim 1, wherein the permanent magnet and the electromagnet relatively rotate with a predetermined gap while the motor is operated.

* * * * *